US009014942B2

(12) United States Patent
Izumoto et al.

(10) Patent No.: US 9,014,942 B2
(45) Date of Patent: Apr. 21, 2015

(54) IDLING STOP DEVICE AND IDLING STOP CONTROL METHOD

(75) Inventors: Ryoh Izumoto, Kobe (JP); Motoki Komiya, Kobe (JP); Yuichiro Shimizu, Kobe (JP); Yoshinori Shibachi, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 249 days.

(21) Appl. No.: 13/583,721

(22) PCT Filed: Mar. 10, 2011

(86) PCT No.: PCT/JP2011/055606
§ 371 (c)(1),
(2), (4) Date: Sep. 10, 2012

(87) PCT Pub. No.: WO2011/114979
PCT Pub. Date: Sep. 22, 2011

(65) Prior Publication Data
US 2013/0006491 A1 Jan. 3, 2013

(30) Foreign Application Priority Data
Mar. 15, 2010 (JP) ................................ 2010-056956

(51) Int. Cl.
*G06F 19/00* (2011.01)
*F02N 11/08* (2006.01)
*F02D 17/04* (2006.01)
*F02D 29/02* (2006.01)

(52) U.S. Cl.
CPC ........... *F02N 11/0859* (2013.01); *F02D 17/04* (2013.01); *F02D 29/02* (2013.01); *F02N2200/063* (2013.01); *F02N 2250/02* (2013.01); *F02N 2300/106* (2013.01); *F02N 11/0818* (2013.01); *F02N 2300/108* (2013.01); *F02N 2300/30* (2013.01)

(58) Field of Classification Search
CPC ............... B60H 1/005; B60H 1/00735; B60H 1/00764; B60H 1/00771; B60H 1/00828; B60H 1/00878; B60H 2001/00992; B60W 10/06; B60W 20/00; F02D 2250/24; F02D 41/08
USPC .............. 701/36, 99; 307/10.1, 10.7; 324/429
See application file for complete search history.

(56) References Cited

U.S. PATENT DOCUMENTS 6,794,847 B2 * 9/2004 Hosoda et al. ................ 320/104
6,975,080 B2 * 12/2005 Kitamura et al. ............. 318/109

(Continued)

FOREIGN PATENT DOCUMENTS

JP A-7-63115 3/1995
JP A-2009-13953 1/2009

OTHER PUBLICATIONS

International Search Report issued in International Patent Application No. PCT/JP2011/055606 dated Jun. 21, 2011.

*Primary Examiner* — Helal A Algahaim
*Assistant Examiner* — Shardul Patel
(74) *Attorney, Agent, or Firm* — Oliff PLC

(57) ABSTRACT

An idling stop device installed in a vehicle includes a microcomputer, a detector, a storage, and a controller. The microcomputer automatically stops an engine of the vehicle when a prescribed stopping condition is satisfied, and automatically activates a starter motor of the engine when a prescribed activating condition is satisfied. The detector detects whether a drive voltage of the microcomputer, which is obtained by dropping a voltage of a battery of the vehicle is less than a threshold value. The storage stores, irrespective of a state of the microcomputer, information indicating that the detector has detected that the drive voltage is less than the threshold value. The controller drops an increasing speed of a current for driving the starter motor when the microcomputer activates the stator motor under the condition that the information is stored in the storage.

5 Claims, 7 Drawing Sheets

(56) References Cited

U.S. PATENT DOCUMENTS

| | | | | |
|---|---|---|---|---|
| 8,330,468 | B2 * | 12/2012 | Mizuno | 324/428 |
| 2002/0047419 | A1 * | 4/2002 | Shimizu et al. | 310/120 |
| 2005/0061282 | A1 * | 3/2005 | Sommerfeld et al. | 123/179.3 |
| 2006/0186738 | A1 * | 8/2006 | Noguchi et al. | 307/10.1 |
| 2009/0021200 | A1 * | 1/2009 | Yaguchi | 318/400.09 |
| 2009/0295399 | A1 * | 12/2009 | Ueda et al. | 324/429 |
| 2010/0217484 | A1 * | 8/2010 | Mizuno | 701/36 |

* cited by examiner

IDLING STOP DEVICE AND IDLING STOP CONTROL METHOD

TECHNICAL FIELD

The present invention relates to an idling stop technology to automatically stop/activate an engine of a vehicle.

BACKGROUND ART

In recent years, for fuel reduction or exhaust gas reduction, an idling stop device for automatically stop/activate an engine of a vehicle during a stop of the vehicle for a relatively short time such as waiting at a stoplight has been put to practical use. For example, according to a vehicle having an idling stop device disclosed in Japanese Unexamined Patent Application Publication No. 2009-13953, if a stopping condition is satisfied, that is, if a brake is stepped on during a traveling state of the vehicle and the vehicle becomes in a stop state, an engine is automatically stopped, while if an activation condition is satisfied, that is, if the brake is released during the stop of the engine, the engine is automatically activated.

SUMMARY OF INVENTION

Problems to be Solved by Invention

Electric power to drive a starter motor for activating an engine of a vehicle is supplied from a battery. The power that the starter motor needs for the activation of the engine is very big, and if the stop/activate of the engine by an idling stop function is repeated in a state where the voltage of the battery has been dropped, the voltage of the battery is further dropped, and thus the engine may not be able to be activated. Accordingly, if the battery deteriorates and the voltage thereof is dropped, measures to prevent the dropping of the voltage of the battery are necessary to assume an engine stop possibility by the idling stop function.

However, as described above, since the power that the starter motor needs for the activation of the engine is very big, the voltage of the battery is greatly dropped in the case of the activation of the engine. Because of this, for example, a user makes a microcomputer having an idling stop device monitor the voltage of the battery when activating the engine through operating of a start switch. Further, if the voltage of the battery is dropped to be less than a predetermined threshold value, in the case of activating the engine by the idling stop function thereafter, it is considered that the microcomputer carries out measures to prevent the dropping of the voltage of the battery.

However, the power to operate the microcomputer is also supplied from the battery, and if the voltage of the battery is greatly dropped to be less than the voltage through which the microcomputer can work in the case of activating the engine, the microcomputer itself is unable to operate and is reset. The microcomputer which has been reset and rebooted in this way is unable to grasp the cause of the reset and the voltage of the battery before being reset. Although the microcomputer is also reset, for example, when it is in a runaway state, in addition to the voltage drop, the microcomputer is unable to grasp the cause of the reset.

Because of this, even in the case where the voltage of the battery is greatly dropped to reset the microcomputer, the microcomputer after the reset carries out the activation of the engine by the idling stop function without taking measures to prevent the dropping of the voltage of the battery. As a result, the reset of the microcomputer reoccurs, and thus the engine might not be able to be activated.

Accordingly, the present invention has been made in consideration of the above-described situations, and an object of the present invention is to provide a technology that can prevent the voltage of a battery from being greatly dropped when an engine is activated through grasping of the dropping of the voltage of the battery even after the reset of a microcomputer.

Means for Solving Problems

In order to achieve the object, according to the present invention, those listed below may be provided.

(1) An idling stop device configured to be installed in a vehicle, including: a microcomputer configured to automatically stop an engine of the vehicle when a prescribed stopping condition is satisfied, and to automatically activate a starter motor of the engine when a prescribed activating condition is satisfied; a detector configured to detect whether a drive voltage of the microcomputer, which is obtained by dropping a voltage of a battery of the vehicle is less than a threshold value; a storage configured to store, irrespective of a state of the microcomputer, information indicating that the detector has detected that the drive voltage is less than the threshold value; and a controller configured to drop an increasing speed of a current for driving the starter motor when the microcomputer activates the stator motor under the condition that the information is stored in the storage.

(2) The idling stop device as described in (1), wherein the controller is configured to generate a PWM signal in which a duty ratio thereof is increasing with time, thereby causing the battery to supply power to the starter motor only when the PWM signal is in an ON state.

(3) The idling stop device as described in (1) or (2), wherein the storage is a logic circuit configured to store 1-bit information.

(4) An idling stop control method for a vehicle provided with a microcomputer configured to automatically stop an engine of the vehicle when a prescribed stopping condition is satisfied, and to automatically activate a starter motor of the engine when a prescribed activating condition is satisfied, the idling stop control method including: detecting whether a drive voltage of the microcomputer, which is obtained by dropping a voltage of a battery of the vehicle is less than a threshold value; storing, irrespective of a state of the microcomputer, information indicating that the detector has detected that the drive voltage is less than the threshold value;

and dropping an increasing speed of a current for driving the starter motor when the microcomputer activates the starter motor under the condition that the information is stored in the storage.

(5) The idling stop control method as described in (4), further including generating a PWM signal in which a duty ratio thereof is increasing with time; and causing the battery to supply power to the starter motor only when the PWM signal is in an ON state.

Advantageous Effects of Invention

According to the above-described configuration, in the case where the drive voltage of the microcomputer is less than the threshold value, the information indicating that the drive voltage has been dropped is stored in the storage even if the microcomputer is reset. Because of this, the microcomputer after the reset can grasp the voltage drop of the battery based on the information. Further, thereafter, since the microcomputer drops the increasing speed of the current that drives the starter motor when the engine is activated, the voltage of the battery is prevented from being greatly dropped when the engine is activated.

MODE TO CARRY OUT INVENTION

Hereinafter, the preferred embodiments of the present invention will be described in detail with reference to the accompanying drawings.

<1. Configuration>

Figure 1:
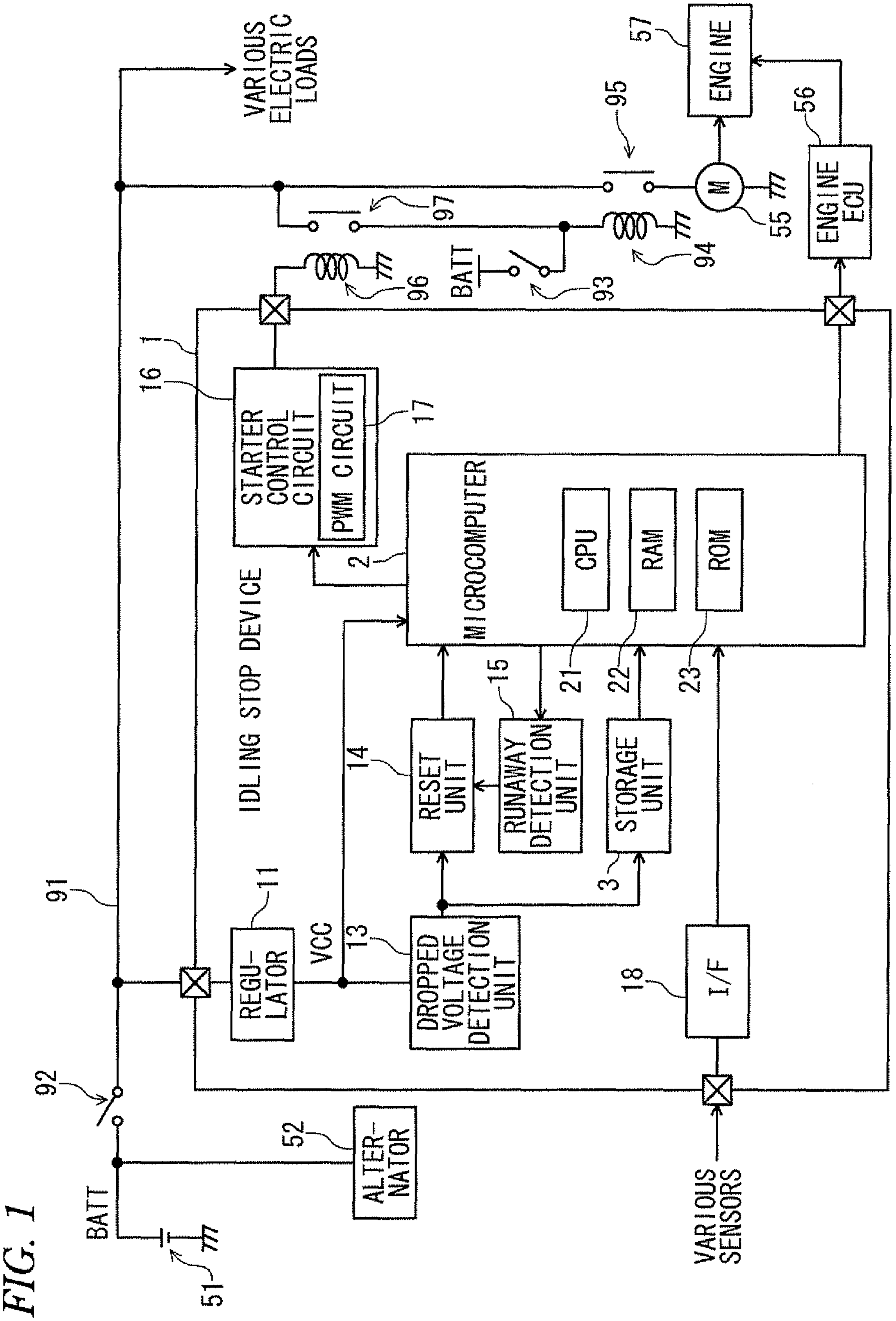
FIG. 1 is a block diagram illustrating the configuration of an idling stop device according to an embodiment of the present invention.

FIG. 1 is a block diagram illustrating the configuration of an idling stop device I and its peripheral elements according to an embodiment of the present invention. This idling stop device 1, for example, is installed in a vehicle such as an automobile, and has a function to automatically stop/activate an engine 57 provided in the vehicle during a stop of the vehicle for a relatively short time such as waiting at a stop-light.

The vehicle in which the idling stop device 1 is installed is provided with a battery 51 that supplies power to an electric load of each vehicle part. The battery 51 is connected to a power line 91, and an ignition switch 92 that a user can operate is provided in the power line 91. If the ignition switch 92 is turned on, a power is supplied from the battery 51 to the idling stop device 1 through the power line 91. Further, if the ignition switch 92 is turned on, the power is supplied from the battery 51 to various electric loads installed in the vehicle through the power line 91.

The engine 57 is activated by driving a starter motor 55. The starter motor 55 is connected to the power line 91 through a first relay switch 95. Because of this, if the first relay switch 95 is turned on, the power is supplied from the battery 51 to the starter motor 55. Through this, the starter motor 55 is driven to activate the engine 57.

The first relay switch 95 is turned on by energizing a corresponding first relay coil 94. The first relay coil 94 is energized when a second relay switch 97 provided on an upper side thereof is turned on or when a start switch 93 that the user can operate is turned on. When the user takes the vehicle, the starter motor 55 is driven to activate the engine 57 in response to the operation that turns on the starter switch 93.

Further, the second relay switch 97 is turned on by energizing a corresponding second relay coil 96. Accordingly, if the second relay coil 96 is energized, the second relay switch 97 is turned on, and current flows through the first relay coil 94. As a result, the first relay switch 95 is turned on, the current flows to the starter motor 55, and the engine 57 is activated.

As compared with the first relay coil 94, the second relay coil 96 can be energized with a small amount of current to turn on the corresponding relay switch (in this case, the second relay switch 97). Accordingly, the engine 57 can be activated with a signal of a relatively small amount of current by energizing the second relay coil 96 rather than by directly energizing the first relay coil 94.

Further, the battery 51 is charged by an alternator that is a generator. The alternator 52 converts mechanical kinetic energy that is transferred from the engine 57 into AC power, and a rectifier that includes a diode rectifies the AC power to DC power. The generated power is accumulated in the battery 51 through the power line 91. In the case of generating the power, the alternator 52 sets a target voltage that is a target of generation, and performs the generation so that the voltage of the power line 91 reaches the target voltage.

The idling stop device 1 is composed of an ECU (Electronic Control Unit), and includes a microcomputer 2 as a main constituent element. The microcomputer 2 includes a CPU 21, a RAM 22, and a ROM 23. Various functions provided in the microcomputer 2 are realized by the operation of the CPU 21 according to a program prerecorded in the ROM 23. An idling stop function is included in such functions provided in the microcomputer 2.

The idling stop function is a function to automatically stop/activate the engine 57 of the vehicle depending on the traveling state of the vehicle. Signals indicating the traveling state of the vehicle are input from various sensors provided in the vehicle to the microcomputer 2 through an interface 18. Specifically, a vehicle speed from a vehicle speed sensor, a position of a shift lever from a shift sensor, operation contents of an accelerator from an accelerator sensor, and operation contents of a brake from a brake sensor are input as the above-described signals.

If a prescribed stopping condition is satisfied on the basis of the signal indicating the traveling state, the engine 57 is stopped by the idling stop function. For example, if various conditions, such as 'the vehicle speed is 0', 'the shift lever is in "D" or "N" state', 'no accelerator operation', and 'brake operation has been performed', are all satisfied, it is determined that the stopping condition has been satisfied.

In the case of stopping the engine 57 through the idling stop function, the microcomputer 2 transmits a prescribed stop signal to the engine ECU 56 that controls the engine 57. The engine ECU 56 stops the engine 57 in response to this signal.

Further, if a prescribed activating condition is satisfied on the basis of the signal indicating the traveling state during the stop of the engine 57 by the idling stop function, the engine 57 is automatically activated by the idling stop function. For example, if various conditions, such as 'the shift lever is in "D" state', 'accelerator operation has been performed', and 'no brake operation', are all satisfied, it is determined that the activating condition has been satisfied.

In the case of activating the engine 57 by the idling stop function, the microcomputer 2 transmits a prescribed activating signal to a starter control circuit 16 provided in the idling stop device 1. The starter control circuit 16 energizes the second relay coil 96 in response to this signal to drive the starter motor 55.

The starter control circuit 16 has two types of control as the control to energize the second relay coil 96. One is a normal control to simply energize the second relay coil 96, and the other is a PWM control to energize the second relay coil 96 only in a period in which a PWM (Pulse Width Modulation)

signal is turned on. The starter control circuit 16 includes a PWM circuit 17 that generates a PWM signal for PWM control. The microcomputer 2 selects either of the normal control and the PWM control depending on the deterioration state of the battery. The details thereof will be described later.

Further, the idling stop device 1 includes a regulator 11 that drops an input voltage to a predetermined voltage as a power supply circuit to the microcomputer 2. The regulator 11, for example, is configured through combination of a switching regulator and a series regulator.

The power of the microcomputer 2 is supplied from the battery 51 of the vehicle. An ideal value of a supply voltage of the microcomputer 2 is, for example, 5 V, whereas a normal voltage of the battery 51 is, for example, 12 V. Because of this, in the idling stop device 1, the regulator 11 drops the voltage BATT of the battery 51 to obtain the voltage VCC of the power of the microcomputer 2.

On the other hand, the regulator 11 regulates the output voltage within the range in which the input voltage is an upper limit. If the input voltage is dropped below a target voltage that should be constant, the output voltage of the regulator 11 is also dropped below the target voltage. Accordingly, if the battery voltage BATT is dropped in a state where the battery 51 has deteriorated, the voltage VCC of the power of the microcomputer 2, which is obtained by dropping through the regulator 11, is also dropped.

Further, the idling stop device 1 includes a dropped voltage detection unit 13, a reset unit 14, and a runaway detection unit 15 as circuits to reset the microcomputer 2.

The dropped voltage detection unit 13 is connected to a power supply line from the regulator 11 to the microcomputer 2 to monitor the voltage (drive voltage) VCC of the power of the microcomputer 2. Further, the dropped voltage detection unit 13 functions as a detector according to the present invention, and if the voltage VCC of the power of the microcomputer 2 becomes less than a prescribed threshold value (for example, minimum operating voltage Vt that the microcomputer 2 can work), the dropped voltage detection unit 13 outputs an instruction signal indicating that the reset should be made to the reset unit 14. The minimum operating voltage Vt of the microcomputer 2 is, for example, 3.9 V. The dropped voltage detection unit 13, for example, is configured as a comparator that compares the voltage VCC with the minimum operating voltage Vt.

The runaway detection unit 15 detects whether the microcomputer 2 has fallen into a runaway state such as freezing of the microcomputer 2. The runaway detection unit 15, for example, monitors an operating signal of a watch dog timer of the microcomputer 2, and if a regular signal is not detected, the runaway detection unit 15 determines that the microcomputer 2 is in a runaway state. In the runaway state, the microcomputer 2 is unable to restore its function unless it is reset. Because of this, the runaway detection unit 15 outputs the instruction signal indicating that the reset should be made to the reset unit 14.

The reset unit 14 outputs a reset signal for instructing a reset to the microcomputer 2. The reset signal is normally "H", and the reset is instructed for the microcomputer 2 when the reset signal is "L". If an instruction signal indicating that the reset should be made is input from any one of the dropped voltage detection unit 13 and the runaway detection unit 15, the reset unit 14 makes the reset signal "L". The microcomputer 2 monitors this reset signal at any time, and if the reset signal becomes "L", the microcomputer 2 is reset. That is, the microcomputer 2 once stops its operation, and then is rebooted.

The idling stop device I includes a storage unit 3 that stores information (hereinafter referred to as "voltage drop information") indicating that the voltage VCC has become less than the minimum operating voltage Vt if the voltage VCC of the power of the microcomputer 2 has become less than the minimum operating voltage Vt. The instruction signal output from the dropped voltage detection unit 13 is also input to the storage unit 3. That is, if the voltage VCC of the power of the microcomputer 2 has become less than the minimum operating voltage Vt, the effect thereof is reported to the storage unit 3 by the instruction signal, and the voltage drop information is stored in the storage unit 3 in response to this.

The storage unit 3 functions as a storage according to the present invention, and includes a flip-flop that is a logic circuit capable of storing 1-bit information. The minimum operating voltage of the storage unit 3 is less than the minimum operating voltage Vt (for example, 3.6 V), and is set, for example, to 1.6 V. That is, the storage unit 3 can hole the memory contents even if the power supply voltage has become less than the minimum operating voltage Vt of the microcomputer 2. Through this, irrespective of the state of the microcomputer 2, the storage unit 3 can store the voltage drop information even during the reset of the microcomputer 2.

If the voltage of the battery 51 has been dropped and the voltage VCC has become less than the minimum operating voltage Vt, the microcomputer 2 is reset, but the voltage drop information is stored in the storage unit 3. The microcomputer 2 after the reset can grasp that the voltage VCC of the power before the reset has become less than the minimum operating voltage Vt based on the voltage drop information stored in the storage unit 3.

<2. Reset Process>

Figure 2:
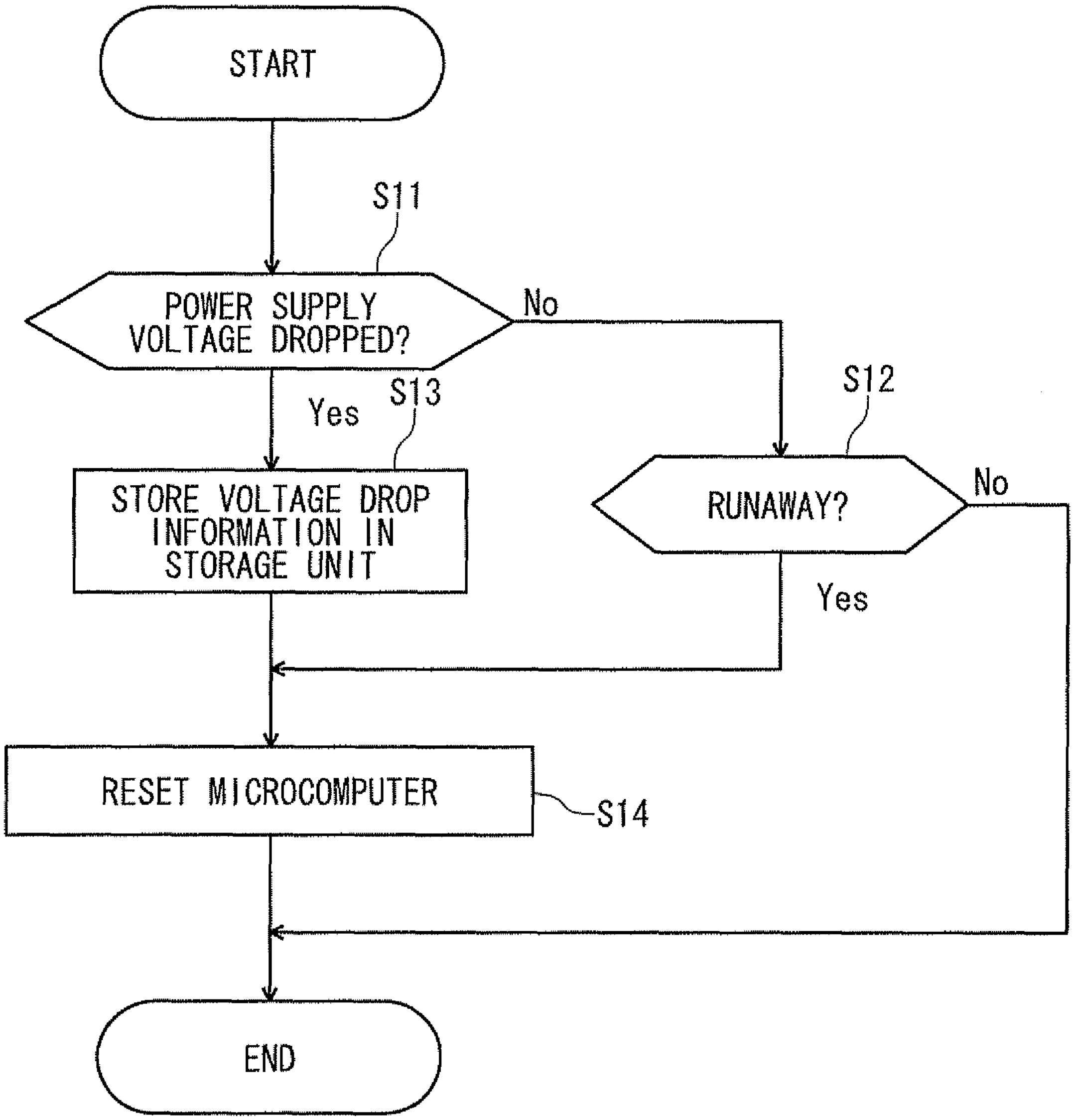
FIG. 2 is a flowchart illustrating a process that an idling stop device carries out when a microcomputer is reset.

Since the power that the starter motor 55 needs is very big, the phenomenon that the microcomputer 2 is reset due to the great voltage drop of the battery 51 occurs when the engine 57 is activated. Hereinafter, the process of the idling stop device 1 in the case where the engine 57 is activated by a user's operation of the start switch 93 will be described. FIG. 2 is a diagram illustrating a flow of a process performed by the idling stop device 1. The start point of the process is just after the user takes the vehicle, and at this time, the idling stop device 1 starts, but the engine 57 does not start.

First, it is determined whether the condition that the microcomputer 2 should be reset during the start of the engine 57 is satisfied. Specifically, it is determined by the dropped voltage detection unit 13 whether the voltage VCC of the power of the microcomputer 2 is less than the minimum operating voltage Vt of the microcomputer 2 (step S11). In addition, it is determined by the runaway detection unit 15 whether the microcomputer 2 has fallen into a runaway state (step S12). If the voltage VCC is equal to or greater than the minimum operating voltage Vt ("No" in step S11) and the engine 57 is completely exploded (is completely activated) ("No" in step S12) in a state where the microcomputer 2 is not in the runaway state, the process is terminated.

Further, if the voltage VCC of the power of the microcomputer 2 is less than the minimum operating voltage Vt ("Yes" in step S11), the instruction signal is output from the dropped voltage detection unit 13 to the reset unit 14. Further, the instruction signal is input to the storage unit 3, and in response to this, the voltage drop information is stored in the storage unit 3 (step S13).

On the other hand, even if the microcomputer 2 has fallen into the runaway state ("Yes" in step S12), the instruction signal is output from the dropped voltage detection unit 13 to the reset unit 14.

If the instruction signal is input from any one of the dropped voltage detection unit 13 and the runaway detection unit 15, the reset unit 14 sets the reset signal to "L". The microcomputer 2 is reset in response to the reset signal set to "L" (step S14). If the voltage drop information is stored in the storage unit 3, the memory of the voltage drop information in the storage unit 3 is maintained even during the reset of the microcomputer 2.

Thereafter, the microcomputer 2 reboots. The microcomputer 2 that has rebooted is able to grasp the cause of the reset based on whether the voltage drop information has been stored in the storage unit 3. That is, if the voltage drop information has not been stored in the storage unit 3, it may be determined that the reset has been made due to the runaway state. On the other hand, if the voltage drop information has been stored in the storage unit 3, it may be determined that the reset has been made due to the voltage VCC having become less than the minimum operating voltage Vt.

Figure 3:
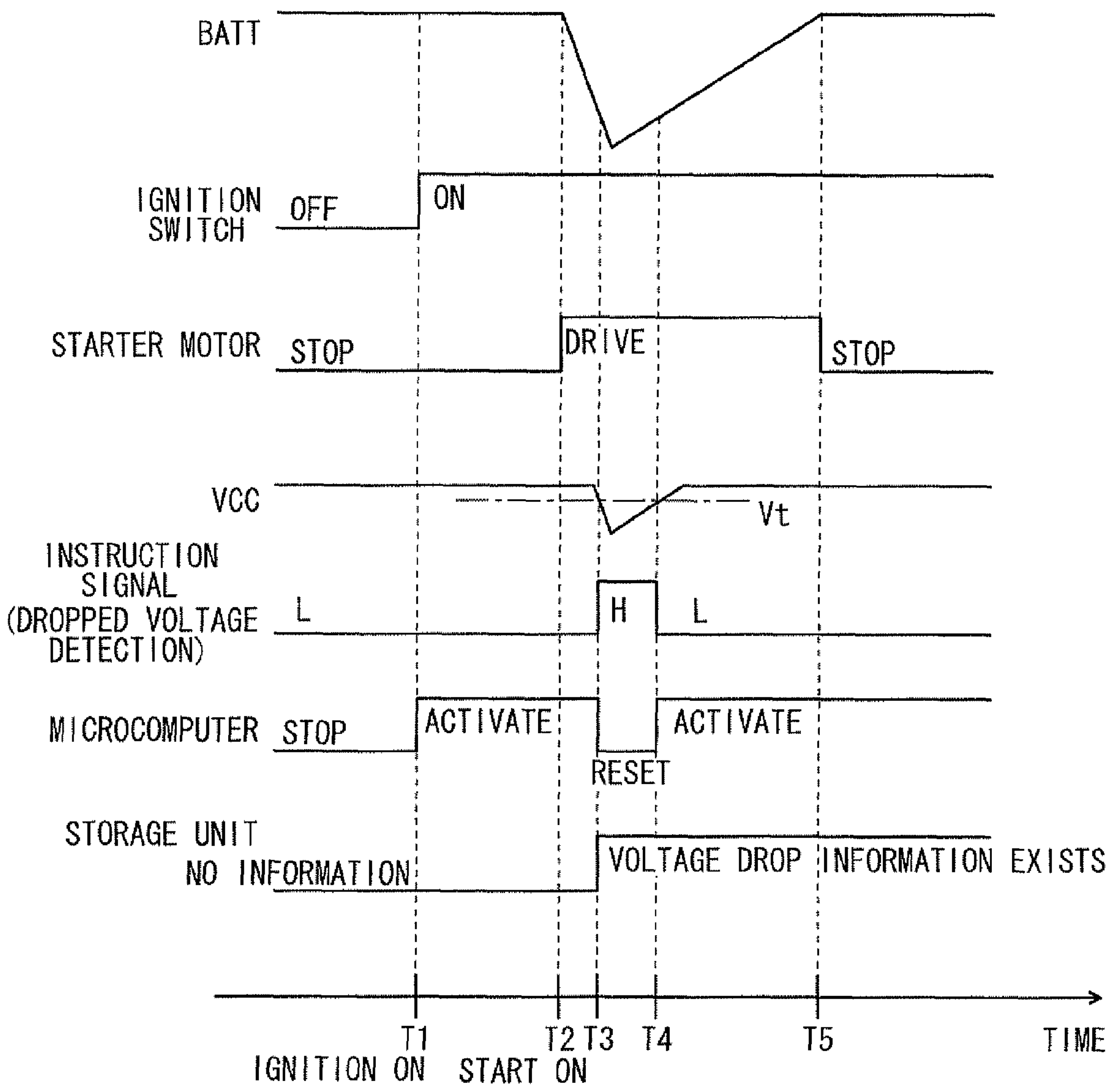
FIG. 3 is a time chart illustrating changes of various signals when a microcomputer is reset.

FIG. 3 is a time chart illustrating changes of various signals in the case where the voltage of the battery 51 is dropped during the activation of the engine 57. At the start time of this chart, the ignition switch 92 is turned off, and the engine 57 has not been activated.

First, at time T1, the ignition switch 92 is turned on by the operation of the user. Through this, power is supplied from the battery 51 to the idling stop device 1, and thus the microcomputer 2 boots up.

Then, at time T2, the start switch 93 is turned on by the operation of the user, and the starter motor 55 is driven. With the driving of this starter motor 55, the voltage BATT of the battery 51 is dropped. Through this, the voltage of the power line 91 is dropped. Further, when the battery 51 deteriorates, the voltage VCC of the power of the microcomputer 2 is also dropped.

Through this, if the voltage VCC of the power of the microcomputer 2 is dropped and becomes less than the minimum operating voltage Vt of the microcomputer 2 at time T3, the dropped voltage detection unit 13 detects this, and generates the instruction signal (sets the instruction signal to "H"). Through this, the reset unit 14 sets the reset signal to "L", and the microcomputer 2 stops its operation to be reset. In addition, the instruction signal from the dropped voltage detection unit 13 is also input to the storage unit 3, and the voltage drop information is stored in the storage unit 3. Thereafter, the voltage drop information is maintained in the storage unit 3 irrespective of the state of the microcomputer 2.

Thereafter, if the load of the starter motor 55 becomes smaller with the rotation of the engine 57, the voltage BATT of the battery 51 is gradually increasing. Through this, the voltage of the power line 91 and the power supply voltage VCC of the microcomputer 2 also increase. Further, if the power supply voltage VCC of the microcomputer 2 increases and becomes equal to or greater than the minimum operating voltage Vt of the microcomputer 2 at time T4, the dropped voltage detection unit 13 stops the instruction signal (sets the instruction signal to "L"). Through this, the reset unit 14 sets the reset signal to "H", and the microcomputer 2 boots up. Thereafter, the microcomputer 2 that has rebooted is able to grasp that the battery 51 has deteriorated and the voltage of the battery 51 has been dropped below a normal voltage thereof based on the voltage drop information stored in the storage unit 3. If the engine is completely exploded, the starter motor 55 is stopped (at time T5).

<3. Idling Stop Process>

If the voltage drop information is stored in the storage unit 3, the microcomputer 2 after the reset performs measures to prevent the dropping of the voltage of the battery 51 when the engine is activated by the idling stop function. Specifically, the microcomputer 2 controls the starter control circuit 16 to energize the second relay coil 96 through the PWM control rather than the normal control. Hereinafter, such a process will be described.

Figure 4:
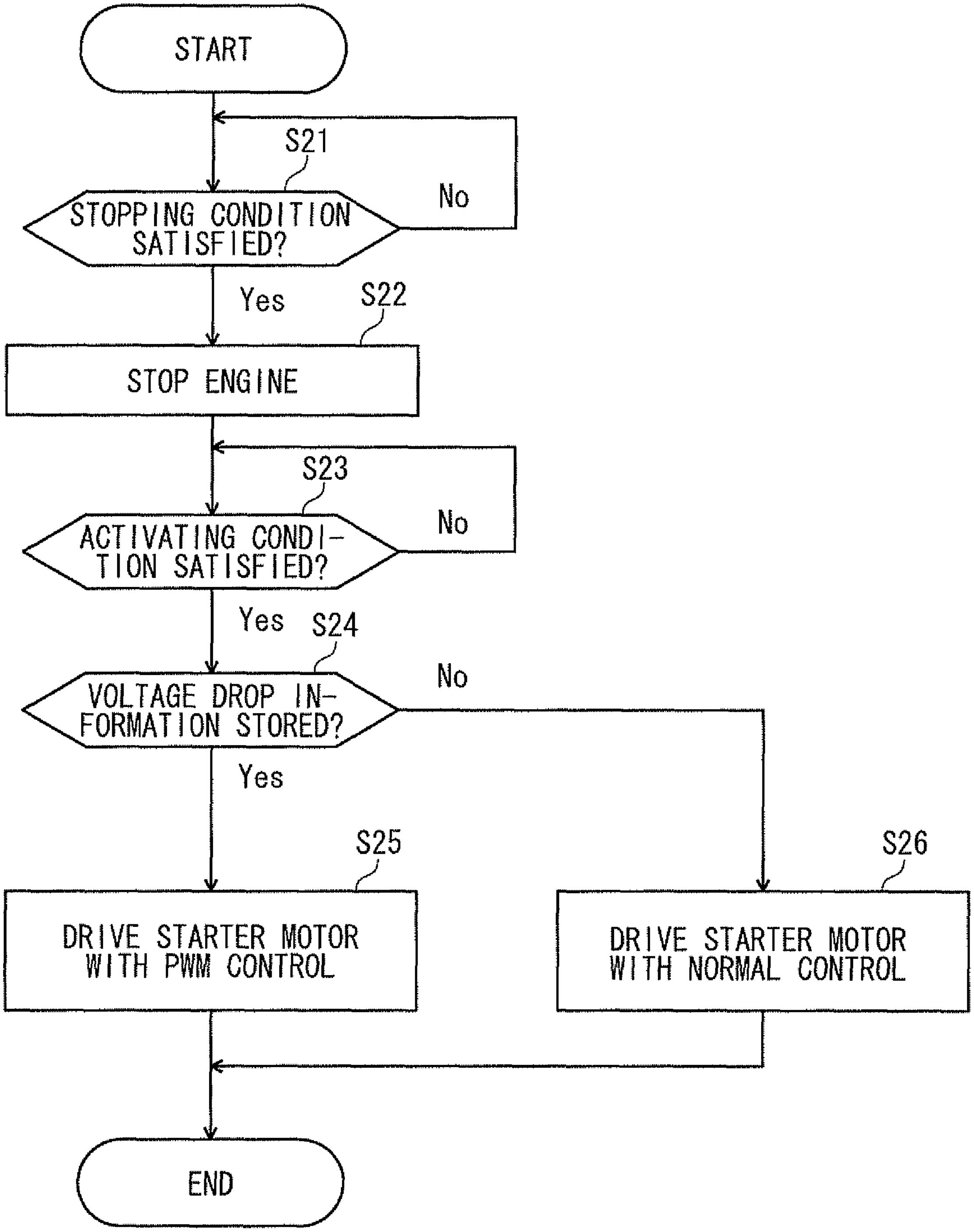
FIG. 4 is a flowchart illustrating a process to affect an idling stop function that an idling stop device carries out.

FIG. 4 is a diagram illustrating a flow of a process related to the idling stop function of the idling stop device 1. At the start point of this process, it is assumed that the engine 57 has been activated.

First, the microcomputer 2 determines whether the stopping condition is satisfied on the basis of an input signal indicating the traveling state (step S21). Then, if the stopping condition is satisfied, the microcomputer 2 transmits a stop signal to the engine ECU 56, and stops the engine 57 (step 522).

Thereafter, the microcomputer 2 determines whether the activating condition is satisfied on the basis of the input signal indicating the traveling state (step S23). If the activating condition is satisfied, the microcomputer 2 determines whether the voltage drop information is stored in the storage unit in succession (step 524).

If the voltage drop information is not stored in the storage unit 3, the battery 51 is normal. In this case, the microcomputer 2 outputs the signal to the starter control circuit 16 and controls the starter control circuit 16 to energize the second relay coil 96 through the normal control to drive the starter motor 55 (step S26). In this case, the second relay coil 96 continues to be energized, and the first and second relay switches 95 and 97 are simply turned on while the second relay coil 96 is energized. Since the battery 51 is normal, it does not greatly affect other electric loads, and the starter motor 55 is driven to activate the engine 57.

On the other hand, if the voltage drop information is stored in the storage unit 3, the battery 51 deteriorates. In this case, the microcomputer 2 outputs the signal to the starter control circuit 16 and controls the starter control circuit 16 to energize the second relay coil 96 through the PWM control to drive the starter motor 55 (step S25). That is, the starter control circuit 16 functions as the controller according to the present invention.

Figure 5:
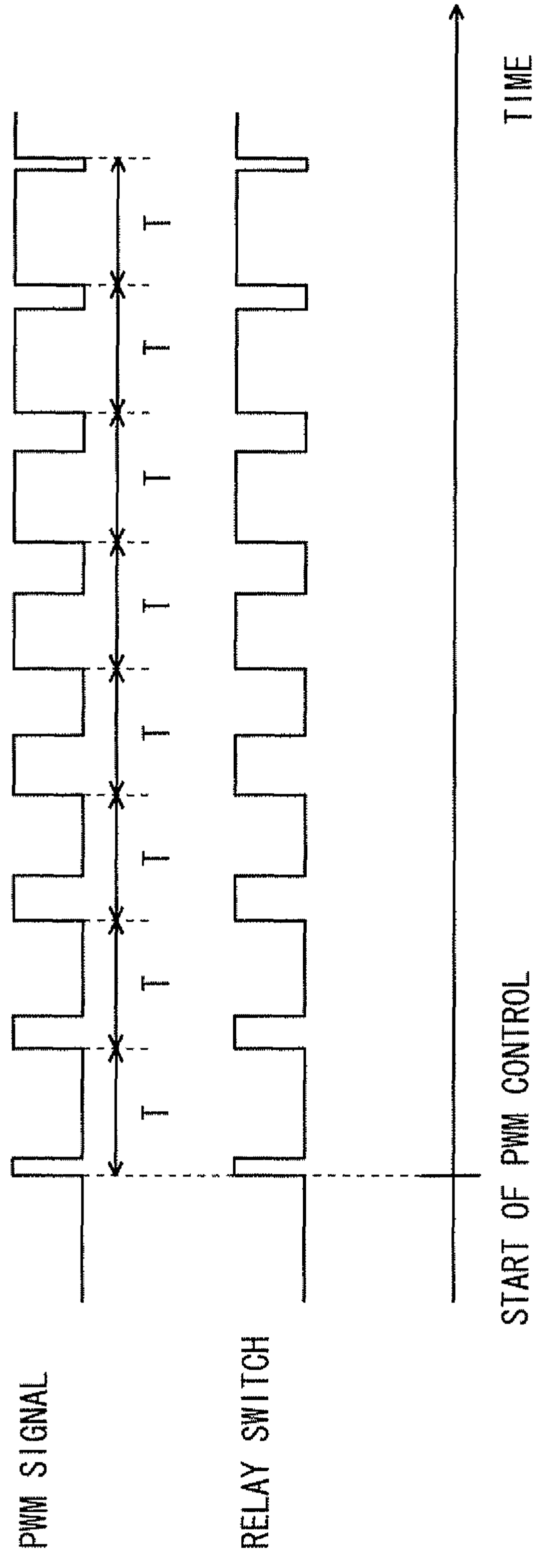
FIG. 5 is a time chart illustrating an example of a PWM signal that an idling stop device generates.

As shown in FIG. 5, the duty ratio (the ratio of a turn-on period in a signal period T) of the PWM signal generated by the PWM circuit 17 is not constant, but is changed to be gradually increasing with the lapse of time from the start of the PWM control. Since the second relay coil 96 is energized only in the turn-on period of the PWM signal, the first and second relay coils 95 and 97 are turned on only in the turn-on period of the PWM signal. Accordingly, the power is supplied from the battery 51 to the starter motor 55 only in the turn-on period of the PWM signal. Through the above-described control, current is gradually supplied to the starter motor 55, and thus the increasing speed i/t (slew rate or increasing speed) of the current of the starter motor 55 can be dropped.

Figure 6:
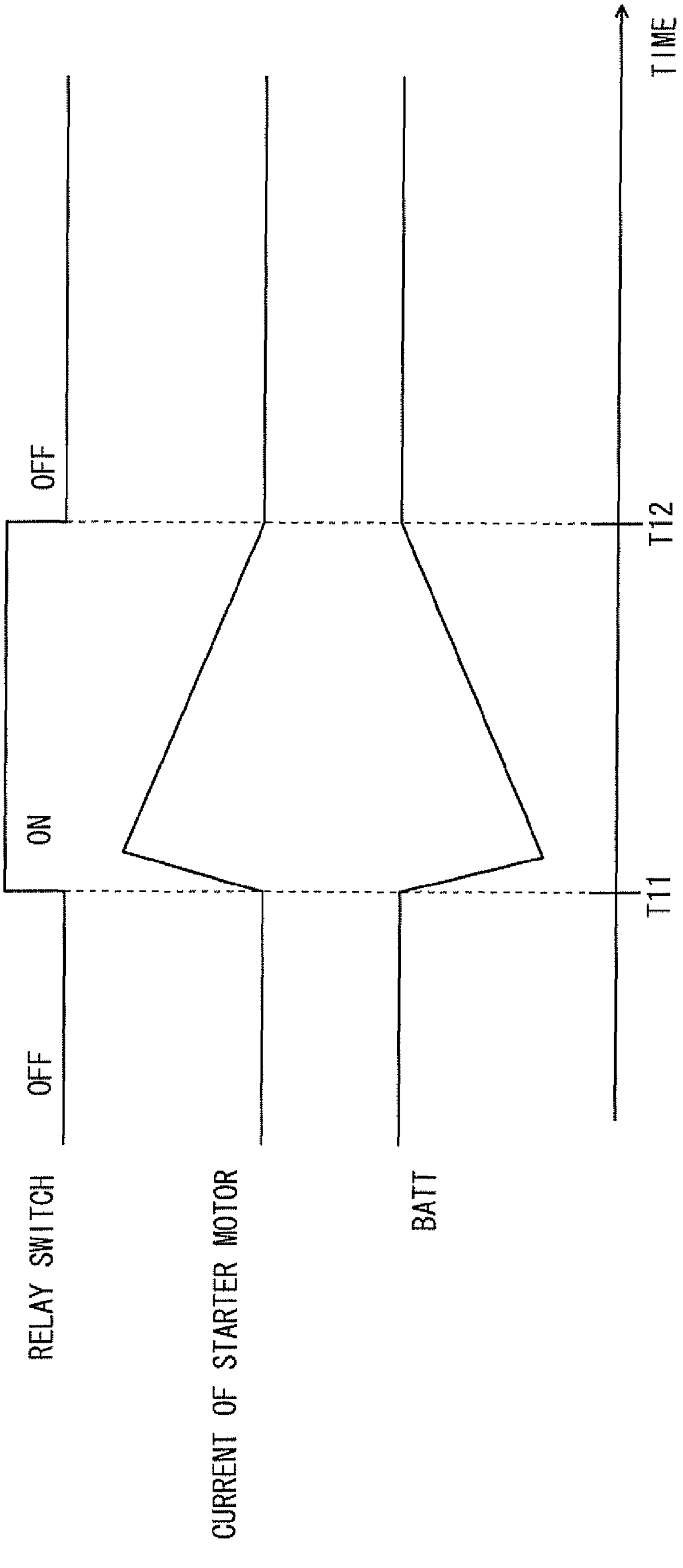
FIG. 6 is a time chart illustrating a change of current of a starter motor in the case where an idling stop device performs a normal control.
Figure 7:
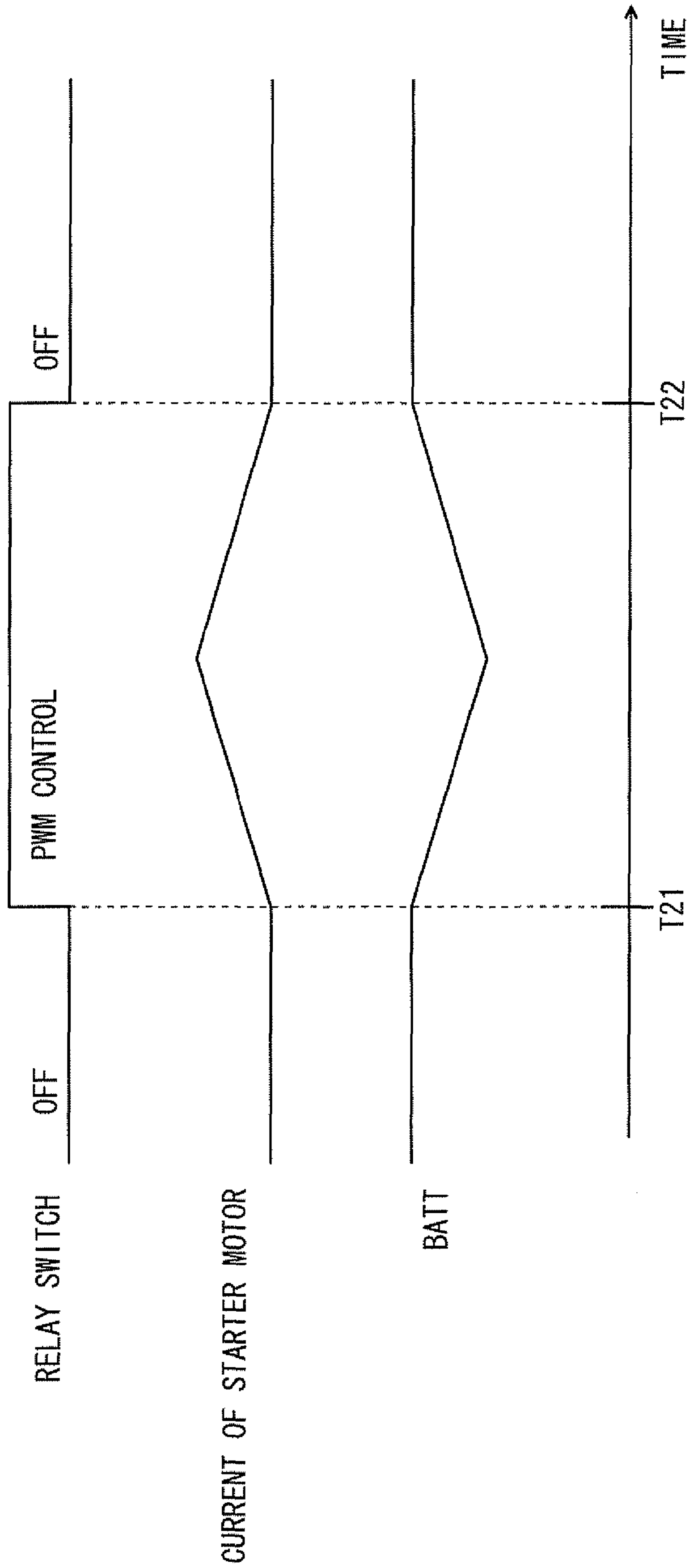
FIG. 7 is a time chart illustrating a change of current of a starter motor in the case where an idling stop device performs a PWM control.

FIG. 6 is a time chart illustrating the change of the current of the starter motor 55 and the voltage BATT of the battery 51 in the case where the starter motor 55 is driven through the normal control. On the other hand, FIG. 7 is a time chart illustrating the change of the current of the starter motor 55 and the voltage BATT of the battery 51 in the case where the starter motor 55 is driven through the PWM control.

In the case of the normal control, as shown in FIG. 6, the first and second relay switches 95 and 97 are turned on at time T11 when the starter motor 55 starts to be driven. Continuously thereafter, the first and second relay switches 95 and 97 are turned on. Since the increasing speed (slew rate) of the current of the starter motor 55 is big, the current of the starter motor 55 suddenly increases just after the start of the driving.

At the same time, the voltage BATT of the battery 51 is suddenly dropped, and thus the voltage of the battery 51 is greatly dropped. Thereafter, if the load of the starter motor 55 becomes smaller with the rotation of the engine 57, the voltage BATT of the battery 51 increases gradually. If the engine 57 is completely exploded at time T12, the first and second relay switches 95 and 97 are turned off to stop the starter motor 55.

In the case of the normal control as described above, the voltage BATT of the battery is greatly dropped. Accordingly, in the case where the battery 51 has deteriorated, the voltage VCC of the power of the microcomputer 2 may be dropped. As a result, the microcomputer 2 is reset, and thus the engine 57 may not start.

By contrast, in the case of the PWM control, as shown in FIG. 7, if the starter motor 55 starts to be driven at time T21, the PWM signal of which the duty ratio is increasing gradually with the lapse of time is generated by the PWM circuit 17, and the first and second relay switches 95 and 97 are turned on only in the turn-on period of the PWM signal (see FIG. 5). That is, only in the turn-on period of the PWM signal, the power is supplied from the battery 51 to the starter motor 55. Through this, the increasing speed (slew rate) of the current of the starter motor 55 can be dropped. As a result, although it takes some time until the complete explosion of the engine 57, the microcomputer 2 is prevented from being reset, and thus it becomes possible to activate the engine 57. If the engine 57 is completely exploded at time T22, the PWM signal is stopped, and thus the starter motor 55 is stopped.

As described above, according to the idling stop device 1 according to this embodiment, in the case where the voltage of the battery 51 is dropped and the voltage VCC of the power of the microcomputer 2 becomes less than the minimum operating voltage Vt of the microcomputer 2, the microcomputer 2 is reset. On the other hand, the voltage drop information is stored in the storage unit 3. Through this, the microcomputer 2 can grasp the dropping of the voltage of the battery 51 based on the voltage drop information. Thereafter, when the engine 57 is activated by the idling stop function, the microcomputer 2 drops the increasing speed of the current of the starter motor 55 through energizing of the second relay coil 96 by the PWM control. Through this, the voltage of the battery 51 is prevented from being greatly dropped, and thus the idling stop function can be maintained.

<4. Modified Examples>

Although the embodiment of the present invention has been described as above, the present invention is not limited to the above-described embodiment, and various modifications can be made. Hereinafter, such modified examples will be described. All forms including the form described in the above-described embodiment and the form to be described hereinafter can be appropriately combined.

The power supply voltage of the storage unit 3 may be directly supplied from the battery 51, or a nonvolatile memory, such as an EEPROM or a flash memory, may be adopted as the storage unit 3. In this case, irrespective of the on/off state of the ignition switch, the voltage drop information can be stored in the storage unit 3. In the case of activating the engine 57 in response to the user's operation of the start switch 93, if the voltage drop information is stored in the storage unit 3, the increasing speed of the current of the starter motor 55 may be dropped by energizing the second relay coil 96 through the PWM control. It is preferable that the voltage drop information is erased from the storage unit 3 during replacement of the battery 51.

Further, although the storage unit 3 is configured as a logic circuit that can store 1-bit information therein in the above-described embodiment, a memory having a relatively large storage capacity may be adopted. However, like the above-described embodiment, if the storage unit 3 is configured by only one logic circuit that can store 1-bit information, the storage unit 3 can be realized at very low costs.

In the above-described embodiment, it is described that various functions are realized by software through the arithmetic operation of the CPU according the program. However, a part of these functions may be realized by an electrical hardware circuit. By contrast, a part of the functions that are realized by the hardware circuit may be realized by software.

Priority is claimed on Japanese Patent Application No. 2010-056956 filed in the Japan Patent Office on Mar. 15, 2010, the contents of which are incorporated herein by reference.

The invention claimed is:

1. An idling stop device configured to be installed in a vehicle, comprising:

a microcomputer configured to automatically stop an engine of the vehicle when a prescribed stopping condition is satisfied, and to automatically activate a starter motor of the engine when a prescribed activating condition is satisfied;

a detector configured to detect whether a drive voltage of the microcomputer, which is obtained by dropping a voltage of a battery of the vehicle is less than a threshold value;

a storage configured to store, irrespective of a state of the microcomputer, information indicating that the detector has detected that the drive voltage is less than the threshold value; and a controller configured to drop an increasing speed of a current for driving the starter motor when the microcomputer activates the stator motor under the condition that the information is stored in the storage.

2. The idling stop device according to claim 1, wherein the controller is configured to generate a PWM signal in which a duty ratio thereof is increasing with time, thereby causing the battery to supply power to the starter motor only when the PWM signal is in an ON state.

3. The idling stop device according to claim 1, wherein the storage is a logic circuit configured to store 1-bit information.

4. An idling stop control method for a vehicle provided with a microcomputer configured to automatically stop an engine of the vehicle when a prescribed stopping condition is satisfied, and to automatically activate a starter motor of the engine when a prescribed activating condition is satisfied, the idling stop control method comprising:

detecting, with a detector, whether a drive voltage of the microcomputer, which is obtained by dropping a voltage of a battery of the vehicle is less than a threshold value;

storing, in a storage, irrespective of a state of the microcomputer, information indicating that the detector has detected that the drive voltage is less than the threshold value; and dropping an increasing speed of a current for driving the starter motor when the microcomputer activates the stator motor under the condition that the information is stored in the storage.

5. The idling stop control method according to claim 4, further comprising:

generating a PWM signal in which a duty ratio thereof is increasing with time; and causing the battery to supply power to the starter motor only when the PWM signal is in an ON state.

* * * * *